Oct. 26, 1948.　　　　F. D. JONES ET AL　　　　2,452,306
POWER BELT RETAINING DEVICE
Filed May 26, 1947　　　　　　　　　　　　　5 Sheets-Sheet 1

INVENTORS
F.D. JONES & L.G. CHEATUM
BY
ATTORNEYS

Oct. 26, 1948.  F. D. JONES ET AL  2,452,306
POWER BELT RETAINING DEVICE
Filed May 26, 1947  5 Sheets-Sheet 2

INVENTORS
F.D. JONES & L.G. CHEATUM
BY
ATTORNEYS

INVENTORS
F. D. JONES & L. G. CHEATUM
BY
ATTORNEYS

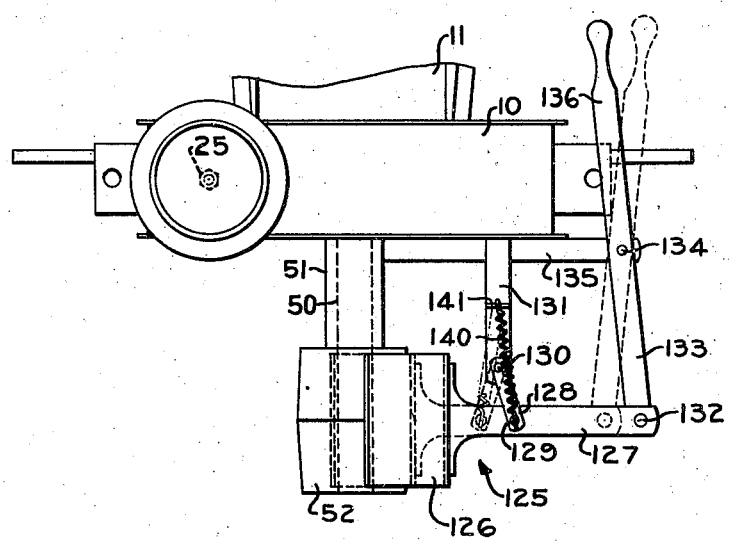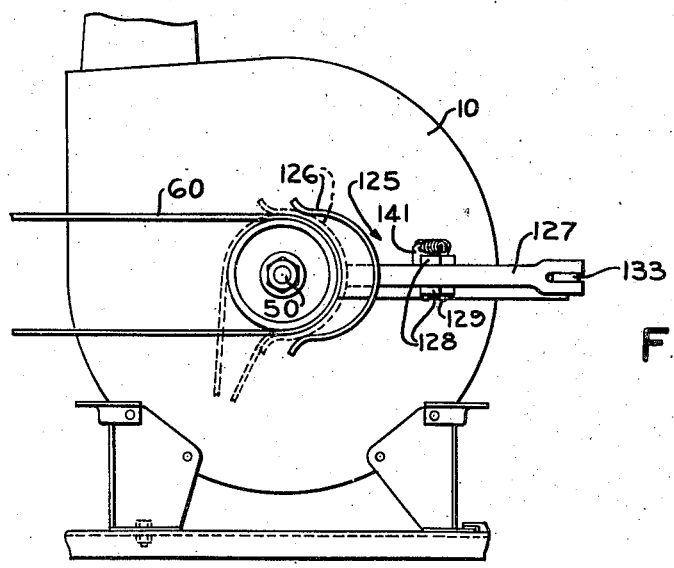

UNITED STATES PATENT OFFICE 2,452,306

POWER BELT RETAINING DEVICE

Frank D. Jones and Leo G. Cheatum, Ottumwa, Iowa, assignors to Deere Manufacturing Co., a corporation of Iowa Application May 26, 1947, Serial No. 750,488

11 Claims. (Cl. 74—242.5)

The present invention relates generally to power transmitting mechanism and more particularly to mechanism of the type comprising a pair of pulleys or sheaves interconnected by a flexible endless power transmitting element, such as a belt. In some belt installations, it is frequently necessary to shut down and swing one of the pulleys horizontally to an inoperative position for a short time and then return the pulley to normal operating position and resume operation. An example of this is a blower type elevator of the type having a feed trough which feeds material such as chopped hay or ensilage, into a blower, which elevates the material to a hay mow or silo. The chopped ensilage is brought up to the feed trough in a wagon, which is unloaded by raising the front end of the wagon to dump the material into the trough. In order to avoid backing the wagon up to the feeder trough, the trough is mounted for horizontal swinging movement, thus providing for swinging the trough out of the way of the wagon to permit the latter to be drawn into position, after which the trough is swung back to its normal position under the tail gate of the wagon.

Sometimes the trough is swung horizontally relative to the blower housing, while in other installations the blower housing and trough are rigidly connected together and are swung about a vertical axis passing through the upwardly extending exhaust duct of the blower. Ordinarily, the blower is driven by a flexible endless power transmitting belt trained over the belt pulley of a tractor or other suitable prime mover. Obviously, when the entire blower, with its feeder and drive pulley, is swung horizontally through an angle of about ninety degrees to permit passage of the wagon, the drive belt will fall off the pulley and therefore must be replaced after each wagon has passed the elevator.

It is the principal object of the present invention, therefore, to provide a device for retaining the power transmitting belt on the blower pulley to prevent the belt from falling off the latter when the blower is swung angularly through an angle of about ninety degrees.

Another object relates to the provision of means for automatically engaging and disengaging the belt retaining device when the implement is shifted out of and returned to its normal operating position, respectively. A further object relates to the provision of a belt retaining device comprising a hemicylindrical clamping member which engages that portion of the belt which is trained over the pulley to hold it in place regardless of the angular shifting movement of the blower.

Still another object relates to the provision of control means responsive to the slackening of the belt as the pulley changes its position, for clamping the device upon the belt and pulley.

Still another object relates to the provision of control means responsive to the position of the blower or other pulley support for controlling the engagement and disengagement of the retaining device.

These and other objects and advantages of the present invention will be apparent to those skilled in the art after a consideration of the following description, in which reference is had to the drawings appended hereto, in which Figure 1 is a top plan view of a blower type elevator embodying the principles of the present invention, showing in solid lines the normal operating position of the implement, and in dotted lines the position of the implement after it has been swung horizontally through approximately ninety degrees;

Figure 6 is a top plan view showing a portion of a blower with drive pulley, and a belt retaining device embodying a third form of the present invention and adapted for manual operation; and Figure 7 is a rear elevational view of the modification shown in Figure 6.

Figure 1:
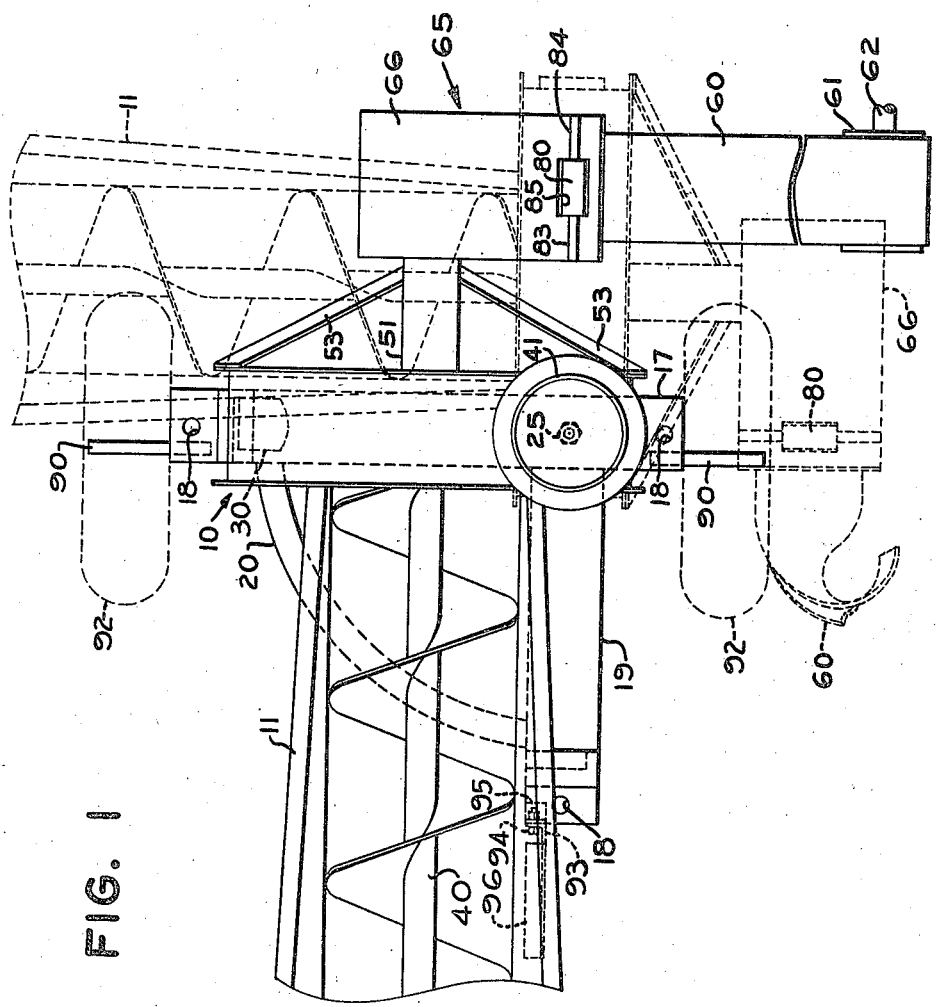
Figure 2:
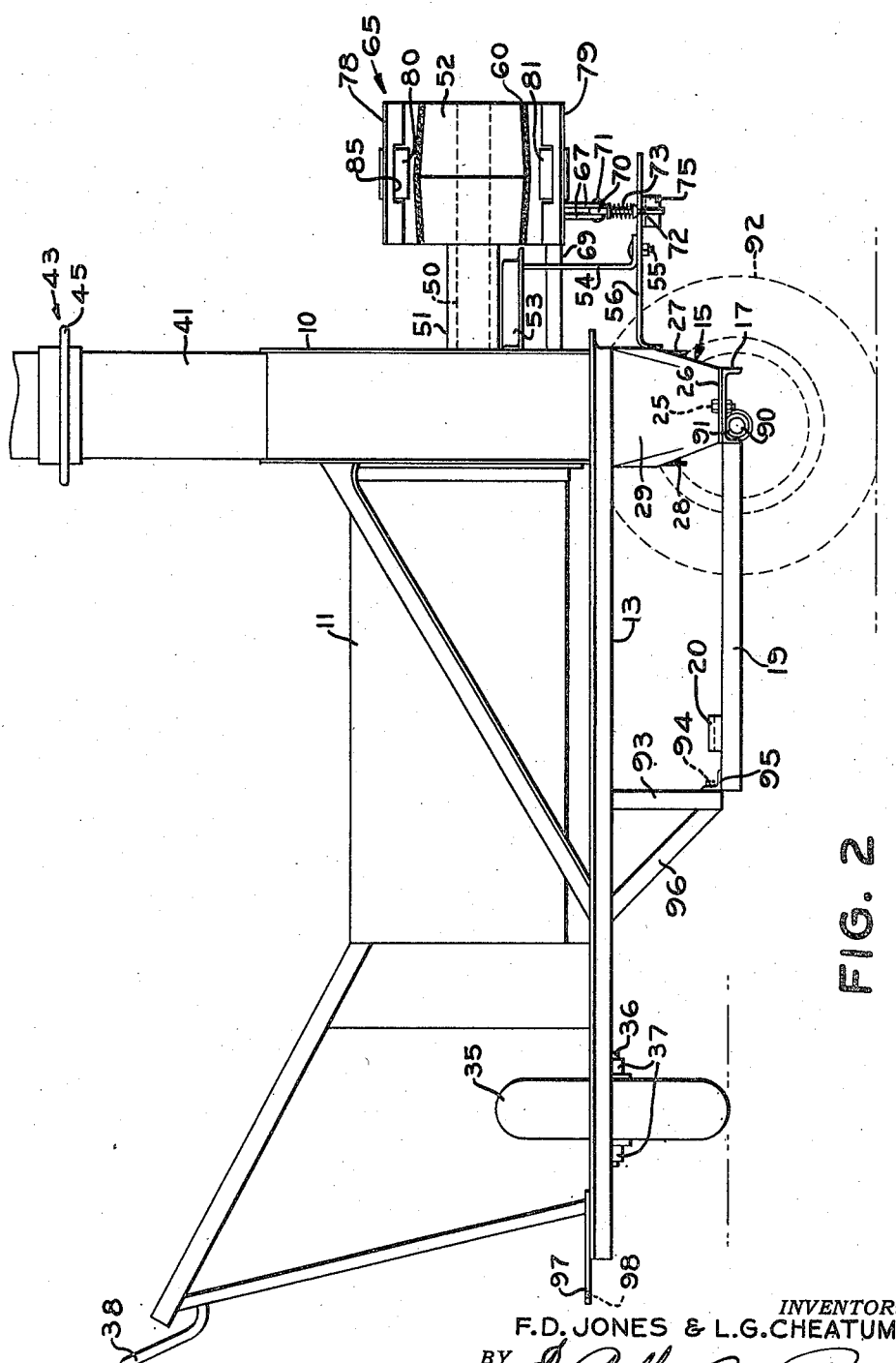
Figure 2 is a side elevational view of the embodiment shown in Figure 1.

Referring now to the drawings, the elevator comprises a blower 10 and a feed trough 11, extending generally parallel to the axis of rotation of the blower rotor (not shown) and communicating with a feed opening 12 in the blower. The blower 10 and trough 11 are mounted on a horizontal frame 13 and comprise a unitary rigid structure.

The blower frame is mounted on a pair of structural legs 15, 16, which are supported on a transversely disposed channel member 17, which projects laterally at opposite sides of the blower, respectively, and is provided with apertures 18, through which anchor stakes can be driven to secure the channel member 17 firmly to the ground during operation. A forwardly extending channel member 19 is rigidly fixed to the channel member 17 at one end and extends beneath the trough 11, providing stability for the blower during operation. A curved bracing member 20 extends from the outer end of the channel member 19 and is fixed to the other channel member 17.

The blower 10 is pivotally mounted on the channel 17 by means of a pivot bolt 25 disposed on a vertical axis and extending through aligned apertures in the channel 17 and a base plate 26 on the bottom of the leg member 15, which is box shaped and comprises three vertical plates 27, 28, 29 fixed together and to opposite sides of the blower 10.

The other leg 16 is also of box construction that has a base plate 30 which rests on top of the channel member 17, but swings horizontally away from the top of the channel 17 when the blower is shifted angularly about the vertical axis of the pivot bolt 25.

The outer end of the trough 11 is supported on a ground engaging wheel 35 journaled on an axle 36 which is supported in a pair of depending supports 37 fixed to the frame 13 of the trough. The axle 36 is disposed generally parallel to the trough and provides for supporting the latter at all times during operation and during swinging movement of the blower 10 and trough 11 about the vertical axis of the pivot bolt 25. A handle 38 is fixed to the outer end of the trough 11, the handle providing a convenient grip for the operator to use in swinging the elevator and trough.

Disposed within the trough is an auger feeder 40, which rotates to move the crop material axially within the trough and through the feed opening 12 into the blower 10.

The blower 10 is provided with an upwardly extending discharge duct 41, rigidly fixed to the blower 10 and disposed coaxial with the pivot bolt 25. The duct 41 is connected with a coaxial discharge pipe or conduit 42 by means of a swivel joint 43, comprising a radially outwardly extending flange 44 around the upper end of the exhaust duct 41 and an annular flange 45 fixed to the discharge pipe 42 and folded around the edge of the flange 44 and extending inwardly beneath the latter at 46.

It is now evident that when the blower 10 and trough 11 are swung horizontally around the axis of the pivot bolt 25, the exhaust duct 41 turns about the same axis but the discharge pipe 42 remains stationary, the upper end being supported on the silo or wall of the barn in a conventional manner.

The blower rotor (not shown) is provided with a drive shaft 50 which extends out of the blower 10 through a bearing sleeve 51 and carries a drive pulley 52 at its outer end. The bearing sleeve 51 is supported on outwardly converging frame members 53 carried on a vertical leg 54 which is fastened at its lower end by a bolt 55 to a horizontal plate 56 extending rearwardly from the blower 10.

The pulley 52 is driven by a flexible endless power transmitting element in the form of a flat belt 60 trained around the pulley 52 and around a drive pulley 61 mounted on a drive shaft 62, which receives power from any conventional source (not shown), such as an electric motor or internal combustion engine disposed remotely from the blower 10.

A belt retainer is indicated in its entirety by reference numeral 65 and comprises a U-shaped clamping element 66 which embraces the pulley 52 and the belt 60 and is rigidly mounted on a pair of parallel links 67, which are apertured at 68 to receive the end of a pin 69 which is fixed to the blower 10 and to the vertical leg 54 and carries the links 67 providing for rocking movement about the axis of the pin 69.

An eyebolt 70 is pivotally connected by a pivot bolt 71 between the outer ends of the links 67 and depends therefrom, being inserted through an aperture 72 in the horizontal plate 56. A helical compression spring 73 is stressed in compression between the plate 56 and the head of the eyebolt 70.

The pair of links 67 and the eyebolt 70 comprises cooperative toggle links, which can be moved against the pressure of the compression spring 73 through an over-center aligned position to rock the U-shaped retainer 66 into and out of engagement with that portion of the belt 60 which is trained around the periphery of the pulley 52.

Figure 3:
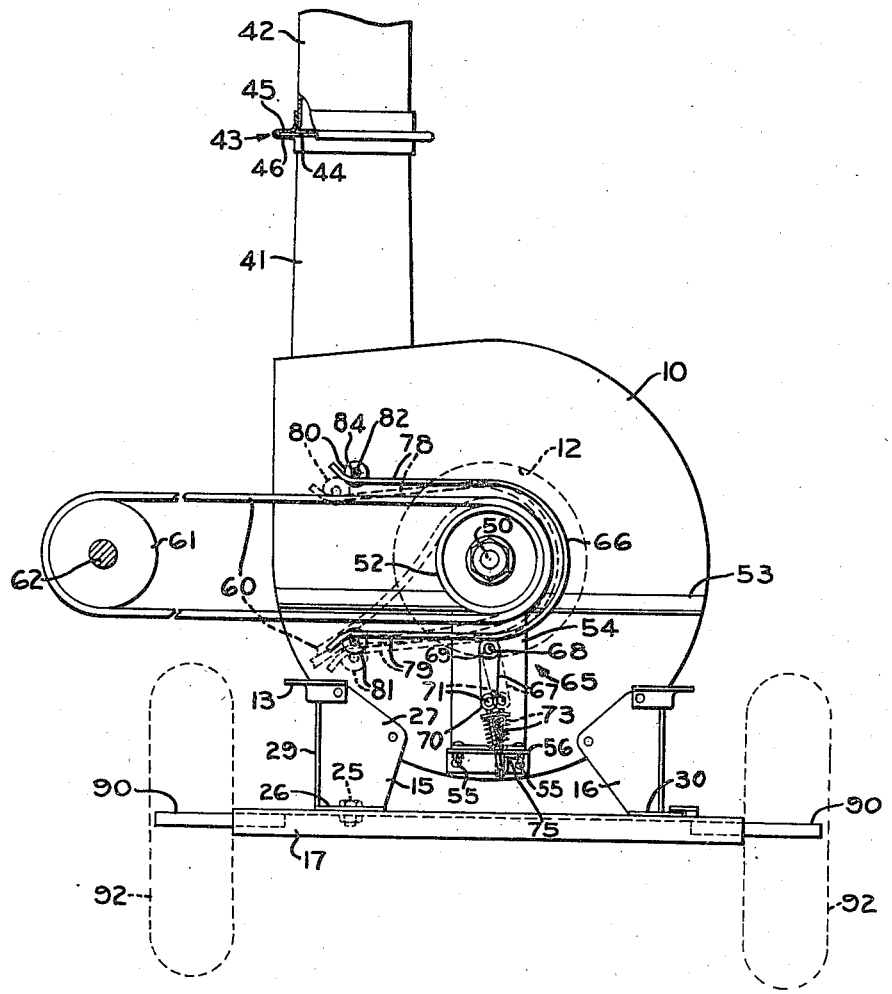
Figure 3 is a rear elevational view of the embodiment of Figures 1 and 2, showing the disengaged position of the retaining device in solid lines, and showing in dotted lines the retaining device in its belt retaining position.

As viewed in Figure 3 (solid lines), the toggle joint 71 is slightly to the left of the dead center aligned position, and the pressure of the spring 73 tends to rotate the links 67 in a clockwise direction about the axis of the pin 69, thereby tending to swing the retainer 66 clockwise away from the belt 60 on the pulley 52. Movement in this direction is limited by a stop flange 75 engaging the lower end of the eyebolt 70 to prevent further movement.

When the retainer 66 and links 67 are rocked about the axis of the pin 69 in a counterclockwise direction, the toggle joint 71 moves over-center, after which the compression spring 70 urges the links 67 in a counterclockwise direction to force the curved portion of the belt retainer 66 into engagement with the belt 60 to hold the latter tight against the periphery of the pulley 52, and thus preventing accidental displacement of the belt from the pulley, regardless of angular displacement of the pulley when the blower and feeder trough are swung horizontally about the axis of the pivot bolt 25.

The belt retainer 66 is shifted automatically into engagement with the belt 60 when the blower is swung angularly, as will now be explained. The upper and lower sides of the U-shaped clamping element 66 are extended along the upper and lower flights of the belt 60, as indicated by reference numerals 78, 79. Each of these extensions carries a roller 80, 81, respectively, each of which is mounted on a shaft 82 journaled in a pair of sleeve bearings 83, 84 at oppostie ends of the roller. Each roller projects through an aperture 85 in the associated leg of the retainer, providing for rolling contact between the two rollers 80, 81 and the outer surface of the belt 60. It will now be evident that when the blower and pulley are angularly shifted about the pivot bolt 25, the pulley 52 moves toward the driving pulley 61 causing the belt 60 to slacken and drop into contact with the lower roller 81, thus forcing the lower arm 79 downwardly about the axis of the supporting pin 69. This shifts the toggle joint 71 across the dead-center position, after which the spring 73 urges the links 67 and retainer 66 in a counterclockwise direction against the portion of the pulley 52 around which the belt 60 is trained, thereby clamping the belt to the pulley and holding the latter while the blower and trough are shifted through a ninety degree angle to permit a wagon to be moved past the blower.

When the new wagon is in position, the blower and trough are then returned to normal position, thereby causing the pulley 52 to move away from the drive pulley 61 and tighten the belt 60 until the upper flight of the belt engages the upper roller 80, urging the upper arm 78 of the belt retainer upwardly and shifting the belt retainer 66 in a clockwise direction about the axis of the supporting pin 69, thereby shifting the toggle joint 71 across the dead-center position until the eyebolt 70 engages the stop 75. In this position the belt retainer 66 does not touch the belt 60 at any point and therefore the drive pulley 61, which is necessarily stationary during the shifting movement, can be brought up to speed once more to drive the blower.

A pair of stub axles 90 are secured, as by welding 91, to the inner side of the channel member 17, which is disposed in inverted position. The stub axles 90 are adapted to receive a pair of transport wheels 92 after the blower has been jacked up off the ground, after which the forwardly extending channel 19 is secured to a bracket 93 depending from the frame 13. For this purpose a bolt 94 is insertable through aligned apertures in the bracket 93 and in an angle 95. A brace 96 extends diagonally upwardly and outwardly from the lower end of the bracket 93. The outer end of the trough frame 13 is provided with a draft plate 97 provided with an aperture 98 by which the plate 97 can be mounted on and connected to the drawbar of a tractor.

Figure 4:
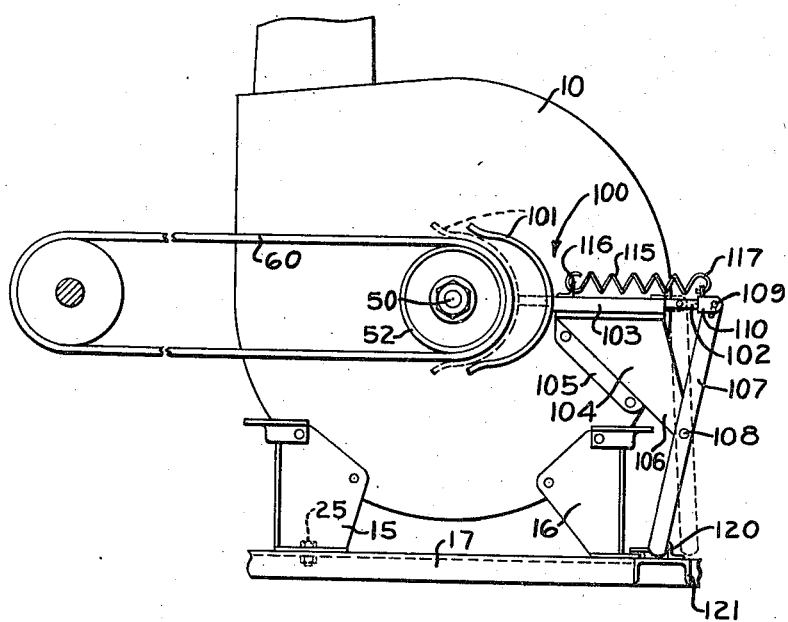
Figure 4 is a rear elevational view showing a modified form of the invention.
Figure 5:
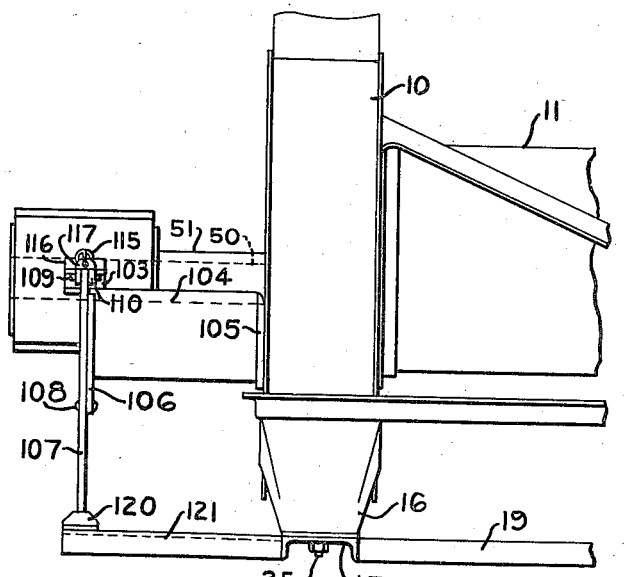
Figure 5 is a side elevational view of the blower and belt retaining device of the form illustrated in Figure 4.

Referring now to the embodiment shown in Figures 4 and 5, the belt retainer 100 comprises a U-shaped clamping element 101 mounted on a longitudinally shiftable rod 102 slidably mounted in a channel 103 which is supported on a bracket 104. The bracket 104 is provided with a mounting flange 105 which is secured to the blower 10 and is provided with a downwardly extending supporting arm 106 at its outer end, which carries a pivoted control lever 107 mounted on the arm 106 by a pivot bolt 108. The upper end of the lever 107 is connected by a pin 109 to a clevis 110 fixed to the outer end of the rod 102. A helical spring 115 is stressed in tension between an angle piece 116 fixed to the supporting channel 103 and an anchor bolt 117 secured to the clevis 110. The spring 115 tends to urge the clamping member 101 toward the left, as viewed in Figure 4, toward the holding position indicated in dotted lines in engagement with that portion of the belt 60 which is trained around the pulley 52.

During normal operation, however, the retaining device is disabled by the control lever 107 engaging a stop in the form of a structural angle piece 120 rigidly fixed, as by welding, to a frame member 121 extending rearwardly from the transverse channel member 17. It will be evident that when the blower 10 and feeder trough 11 swing about the vertical axis of the pivot bolt 25, the lever 107 moves away from the stop 120, thereby allowing the spring 115 to urge the clamping member 101 into engagement with the belt 60 and pulley 52 to retain the belt on the pulley. When the blower 10 is returned to its normal position, the lower end of the lever 107 once more engages the stop 120 and pulls the retainer 101 away from engagement with the belt 60, after which operation can be resumed once more.

Referring now more particularly to Figures 6 and 7, the belt retaining device 125 in this embodiment is manually operated and comprises a U-shaped clamping member 126 mounted on a supporting rod 127, which is carried on a pair of upper and lower pivoted links 128, which are pivotally connected to the rod 127 by a pivot pin 129 and at their opposite ends are connected by a pivot pin 130 to a supporting frame member 131. The outer end of the supporting shaft 127 is pivoted at 132 to the end of a control lever 133 which is pivotally supported at 134 on a frame member 135 fixed to the blower 10. The lever 133 is provided with a handle 136 by means of which the lever can be swung about the supporting pivot 134 to shift the clamping member 126 between engaged position, as indicated in dotted lines, and disengaged position, as indicated in solid lines.

The retaining member 126 is held in either engaged or disengaged position by means of an over-center spring mechanism including a tension spring 140 anchored at one end to a lug 141 on the frame member 131 and passing near the pivot axis of the pivot pin 130 to a connection with the pivot pin 129.

In the disengaged position, shown in solid lines, the tension spring 140 tends to swing the links 128 in a counterclockwise direction, as viewed in Figure 6, thus holding the clamping member 126 away from the belt 60. When the operator swings the lever 133 in a clockwise direction toward the position indicated in dotted lines, the clamping member 126 is pushed forwardly toward the pulley 52, whereupon the links 128 move in a clockwise direction, as viewed in Figure 6, stressing the spring 140 in tension until the axis of the spring passes over the axis of the pivot pin 130, after which the spring tension tends to urge the clamping member 126 into clamping engagement with the portion of the belt 60 which is trained around the pulley 52, thereby retaining the belt on the pulley as the latter is shifted angularly from its operating position.

We claim:

1. In combination with a pulley and a flexible power transmitting element trained thereover, a retaining device for holding said element on said pulley comprising a U-shaped clamping member adapted to straddle said pulley and element thereon, and means for urging said member into clamping engagement.

2. In combination with a pulley, a flexible power transmitting element trained thereover and a support for said pulley, said support being shiftable to swing the axis of said pulley angularly out of and into a normal operating position, a retaining device mounted on said support by means providing for shifting movement into and out of a position in engagement with a portion of said element engaging said pulley, and means for holding said device in said engaging position to retain said element on said pulley during a shifting of the latter out of said normal position.

3. The combination set forth in claim 2, including the further provision that said device comprises a U-shaped clamping member adapted to straddle that arcuate portion of the pulley over which said element is trained.

4. The combination set forth in claim 2, including the further provision that said mounting means for said retaining device comprises a link means swingably mounted on said support and said holding means includes an over-center spring mechanism for urging said retaining device into or out of holding position, selectively.

5. The combination set forth in claim 2, including the further provision of means responsive to slackening of said flexible power transmitting element for shifting said retaining device into retaining position.

6. The combination set forth in claim 2, including the further provision that said retaining device includes a control part extending under said flexible power transmitting element and engageable by the latter when it slackens responsive to shifting movement of said support, to shift said retaining device into retaining position.

7. The combination set forth in claim 2, including the further provision that said retaining device includes control parts extending above and below said flexible power transmitting element, said part below the element being engageable by the latter when it slackens responsive to shifting movement of said support, to shift said retaining device into engagement with said element to hold the latter on said pulley, and said part above the element being engageable by the latter as it tightens responsive to return of said support to normal position, to shift said retaining device to an inoperative position.

8. The combination set forth in claim 2, including the further provision that said retaining device comprises a U-shaped clamping member adapted to straddle that arcuate portion of the pulley over which said element is trained and having sides extended over and under said flexible element, and said mounting means for the retaining device comprising a pivot pin on said support beneath said pulley, said side extended under said element being engageable by the latter when it slackens, thereby swinging said retaining device into engagement with the power transmitting element on said arcuate portion of the pulley, said side of the device extended over said power transmitting element being engageable by the latter as it tightens, to shift said retaining device to disengaged position.

9. The combination set forth in claim 2, including the further provision of means responsive to shifting of said support for controlling the movement of said retaining device into and out of engagement with said element.

10. The combination set forth in claim 2, including the further provision that said holding means comprises means for biasing said retaining device toward engagement with said element, and including control means operable automatically when said pulley is in normal operating position for overcoming said biasing means to hold said device out of engagement, said control means being disabled responsive to shifting said support and pulley out of said normal position to permit said retaining means to move into engaged position.

11. The combination set forth in claim 2, including the further provision that said holding means comprises a spring for urging said retaining device toward engagement with said element, and further including a control lever mounted on said support for shifting said retaining device out of engagement, said lever being engageable with a stop when said support and pulley are shifted into operating position to hold said retaining means out of engagement with said element, against the force of said spring.

FRANK D. JONES.
LEO G. CHEATUM.

No references cited.